(12) United States Patent
Nozaki et al.

(10) Patent No.: US 8,787,042 B2
(45) Date of Patent: Jul. 22, 2014

(54) DC POWER SUPPLY INCLUDING ARRANGEMENT TO REDUCE SWITCHING LOSS AND A SNUBBER CIRCUIT TO SUPPRESS SURGE VOLTAGES

(75) Inventors: Yuichiro Nozaki, Hitachinaka (JP); Tetsuo Kojima, Hitachinaka (JP); Masafumi Makino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 151 days.

(21) Appl. No.: 13/367,653

(22) Filed: Feb. 7, 2012

(65) Prior Publication Data

US 2012/0224396 A1 Sep. 6, 2012

(30) Foreign Application Priority Data

Mar. 3, 2011 (JP) ................................. 2011-046169

(51) Int. Cl.
*H02M 3/335* (2006.01)
*H02M 1/34* (2007.01)
(52) U.S. Cl.
USPC ........................................ 363/21.03; 363/53
(58) Field of Classification Search
CPC ................. H02M 2001/0058; H02M 3/33576; H02M 1/34
USPC ............ 363/17, 20, 21.01–3, 52, 53; 323/311
See application file for complete search history.

(56) References Cited

U.S. PATENT DOCUMENTS 5,886,884 A * 3/1999 Baek et al. .................. 363/17
5,946,200 A * 8/1999 Kim et al. ..................... 363/17
6,349,044 B1 * 2/2002 Canales-Abarca et al. ..... 363/17
2008/0170418 A1 * 7/2008 Nishiyama et al. ............. 363/17
2012/0249059 A1 * 10/2012 Matsumae et al. ............. 363/17

FOREIGN PATENT DOCUMENTS

EP          1 396 926 A1     3/2004
GB          2459764 A        11/2009

(Continued)

OTHER PUBLICATIONS

Lin, Song-Yi and Chen, Chern-Lin; Analysis and Design for RCD Clamped Snubber Used in Output Rectifier of Phase-Shift Full-Bridge ZVS Converters; IEEE Transactions on Industrial Electronics, vol. 25, No. 2, Apr. 1998 (pp. 358-359); USA.

(Continued)

*Primary Examiner* — Adolf Berhane
*Assistant Examiner* — Jye-June Lee
(74) *Attorney, Agent, or Firm* — Antonelli, Terry, Stout & Kraus, LLP.

(57) ABSTRACT

In a DC power supply in which a DC power source and a transformer are connected via a power conversion circuit and a secondary winding of the transformer is connected to a load via a rectifier diode bridge and a filter circuit to supply power to the load, a resonance reactor is provided on an output side of the transformer, a resonant switch circuit including a parallel circuit of a diode and a semiconductor switch and a resonant capacitor is connected in parallel to the rectifier diode bridge and a snubber circuit including a snubber capacitor, a snubber diode and a diode for discharge is connected to a serial resonant circuit including the resonance reactor and the resonant capacitor in the resonant switch circuit to absorb a surge voltage.

8 Claims, 14 Drawing Sheets

(56) References Cited

FOREIGN PATENT DOCUMENTS

| JP | 4-368464 | 12/1992 |
|----|----------|---------|
| JP | 09-285126 | 10/1997 |
| JP | 11-98836 | 4/1999 |
| JP | 2006-352959 | 12/2006 |
| JP | 2008-79403 | 4/2008 |
| JP | 2009-273355 | 11/2009 |

OTHER PUBLICATIONS

Cho, Jung-Goo et al; Novel Zero-Voltage and Zero-Current Switching Full-Bridge PWM Converter Using a Simple Auxiliary Circuit; IEEE Transactions on Industry Applications, vol. 35, No. 1, Jan./Feb. 1999 (pp. 15-20); USA.

O. Deblecker et al., Comparative Analysis of Two Zero-Current Switching Isolated DC=DC Converters for Auxiliary Railway Supply, SPEEDAM 2008, IEEE Trans. on Power Electronics, Sep. 2008, Vo. 23, No. 5, Email: Olivier.Deblecker#fpms.ac.be.

* cited by examiner

SW IS TURNED ON AT TIME t = 0 (TIME t6)

L1<L2<L3

Cz IS CONSTANT

DC POWER SUPPLY INCLUDING ARRANGEMENT TO REDUCE SWITCHING LOSS AND A SNUBBER CIRCUIT TO SUPPRESS SURGE VOLTAGES

The present application is based on and claims priority of Japanese patent application No. 2011-046169 filed on Mar. 3, 2011, the entire contents of which are hereby incorporated by reference.

BACKGROUND OF THE INVENTION

1. Field of the Invention

The present invention relates to insulated DC-DC converters that output DC power, and specifically relates to a DC power supply including a circuit for reducing semiconductor switching loss and a snubber circuit that suppresses a surge voltage generated in a rectifier circuit when a switching device is turned on.

2. Description of the Related Art

DC-DC converters are used when an unstable DC power source is stabilized, when a DC voltage is changed or when it is necessary to provide output of a DC power source that is electrically insulated from an input. Among them, in a DC power supply, an input and an output of which are electrically insulated from each other, a transformer used for the insulation can be downsized in proportion to an increase in used frequency.

Meanwhile, there is a limit on an increase in switching frequency because of heat generation due to switching loss in a semiconductor switch. Therefore, an identical example configuration in which a commutation circuit using a resonant circuit is provided to reduce switching loss is disclosed in Japanese Patent Laid-Open Publication 4-368464 (Patent Document 1) and "Comparative Analysis of Two Zero-Current Switching Isolated DC-DC Converters for Auxiliary Railway Supply," (O. Deblecker, A. Moretti, and F. Vallee, SPEEDAM 2008) (Non-Patent Document 1).

FIG. 7 illustrates an example of a conventional resonant circuit described in these documents. Reference numeral 101 denotes an input DC power source, reference numeral 102 denotes a filter circuit including a filter reactor and a filter capacitor, reference numeral 103 denotes a resonant switch circuit, and reference numeral 104 denotes a gate controller that controls on/off of respective semiconductor switches.

An operation of the circuit in FIG. 7 will be described. Reference numerals Q1 to Q4 denote semiconductor switches included in an inverter circuit, to which free-wheel diodes D1 to D4 are attached, respectively. A primary winding of a transformer T is connected between a connection point a between the semiconductor switches Q1 and Q2 and a connection point b between the semiconductor switches Q3 and Q4, and a secondary winding of the same is connected to a connection point c and a connection point d of a bridge including rectifier diodes D5 to D8, via a resonance reactor Lz. An output of the bridge is provided to a load RL via the filter circuit 102.

The resonant switch circuit 103 is interposed between the output side of the bridge rectifier circuit and the filter circuit 102.

The gate controller 104 gives on/off instructions to the semiconductor switches Q1 to Q4 and a semiconductor switch Qz for resonant circuit control, respectively. While the semiconductor switches may be bipolar transistors, MOSFETs, thyristors, gate turnoff thyristors, IGBTs or the like, here, a description will be provided using IGBTs as a representative example.

FIG. 8 is a diagram illustrating temporal change in operational waveforms for describing the conventional example in FIG. 7. Here, Iab is a current flowing between the connection points a and b, Vab is a voltage between the connection points a and b, Iz is a current flowing in the resonant circuit, Vz is a voltage of opposite ends of a resonant capacitor Cz. Io is a current free-wheeling from the bridge rectifier circuit through the filter circuit 102 and the load RL.

A circuit operation will be described using the aforementioned diagram. When an on signal is provided from the gate controller 104 to each of the semiconductor switches Q1 and Q4, whereby the semiconductor switches Q1 and Q4 in the inverter circuit are in a conductive state. The current Iab flows to convey energy from the input DC power source 101 to the load RL.

When a signal to turn on the semiconductor switch Qz for resonant circuit control in the resonant switch circuit 103 is provided from the gate controller 104 to turn on the semiconductor switch Qz for resonant circuit control at a time t0 before turning off the semiconductor switches Q1 and Q4 in the inverter circuit, a charge current flows into the resonant capacitor Cz from the input DC power source 101. The current Iz is a serial resonant current between the resonance reactor Lz and the resonant capacitor Cz.

A current flowing in the semiconductor switches Q1 and Q4 is a sum of the current Id flowing toward the load and the resonant current Iz and increases in a sinusoidal form. At that time, a voltage is generated in the resonant capacitor Cz, and the voltage becomes a voltage higher than a secondary voltage of the transformer T.

At a time t1, the charging is completed, and the voltage reaches a maximum value. Subsequently, the resonant capacitor Cz start discharging, and a discharge current flows out to a path through a free-wheel diode D9 and the resonant capacitor Cz. Here, where a turn ratio of the transformer T is 1:1, the current Id in the filter reactor Ld flows so as to have a constant value that is a sum of the current Iab and the resonant current Iz, and thus, when the resonant current Iz increases, the current Iab decreases.

At a time t2, the resonant current Iz and the current Id are equal to each other, and thus, the current Iab is zero. The discharge progresses, and finally, at a time t4, the resonant capacitor Cz has completely discharged, and the resonant current Iz becomes zero. Meanwhile, the current Id flowing in the filter reactor Ld is continuous, and thus, at the point of time when the discharge current Iz from the resonant capacitor Cz becomes zero, the current Id is switched to the current Io flowing in the rectifier diodes D5 to D8. The continuity of the current Id is maintained as described above.

Upon a turnoff signal being transmitted from the gate controller 104 to each of the semiconductor switches Q1 and Q4 to turn the semiconductor switches Q1 and Q4 off at a time t3 between the time t2 and a time t4 when the resonant current Iz flows in the free-wheel diode D9 and the primary-side current Iab of the transformer is zero, the primary-side voltage Vab of the transformer becomes zero, and a voltage of a level that is equal to an input DC power source voltage E is applied to the semiconductor switches Q1 and Q4.

This is because a slight amount of excitation current remaining in the transformer free-wheels in a path of the diode D3, the input DC power source 101 and the diode D2. The current in the semiconductor switches Q1 and Q4 is substantially zero at the time t3, and thus, almost no switching loss occurs in the process of the turnoff.

Meanwhile, when the semiconductor switch Qz for resonant circuit control is turned on at the time to, the resonant current Iz is gradually increased by the resonance reactor Lz, and in a transient state of the turning-on, the resonant current Iz still has a small value and thus, there is only small switching loss.

Also, when the semiconductor switch Qz for resonant circuit control is turned off in a period in which the free-wheel diode D9 is conductive and the resonant current Iz is positive, the current in the semiconductor switch Qz for resonant circuit control is already zero, and thus, in the process of the turnoff, no switching loss occurs. However, loss caused by recovery occurs in the free-wheel diode D9 for the semiconductor switch Qz for resonant circuit control.

At a time t5, a turn-on instruction is provided from the gate controller 104 to each of the semiconductor switches Q2 and Q3, and turning-on of the semiconductor switches Q2 and Q3 is started. At this time, the current Id flowing in the filter reactor Ld is equal to the current Io free-wheeling in the rectifier diodes D5 to D8. At this time, the current Iab starts flowing through the resonance reactor Lz, and thus, cannot rapidly increase. Furthermore, the current Id can be regarded as constant and thus changes so that the current Id is a sum of the current Io and the current Iab. Accordingly, the current Iab increases by the amount of decrease of the current Io.

Therefore, in a transient state of the semiconductor switches Q2 and Q3 being turned on, almost no current flows. Therefore, there is only a small turning-on loss. The current Iab gradually increases, and at a time t6, becomes equal to the current Id, and the current Io becomes zero. In a subsequent half cycle from times t0' to t6', the counterpart arms (semiconductor switches Q2 and Q3) operates based on a principle similar to that described above.

In fact, from the time t5 to the time t6, when the free-wheeling current Io flows in the diodes, a voltage in an opposite direction is applied from the primary side of the transformer to the diodes, a phenomenon called recovery (reverse recovery) occurs in a set of the rectifier diodes D5 and D8 or a set of the rectifier diodes D6 and D7, and at the time t6, a surge voltage is generated. The surge voltage oscillates for a certain period of time due to a resonance phenomenon caused by an inductance of the recovery path and a junction capacitance of the rectifier diodes.

FIG. 9 illustrates voltage and current waveforms of the rectifier diode D6 at that time. While characteristics of recovery is determined depending on the nature of the diode, as illustrated in FIG. 9, in many cases, the voltage exceeds a withstanding voltage of the diode, resulting in breakage of the diode. Also, even though the voltage does not exceeds the withstanding voltage of the diode, high-frequency electromagnetic noise is generated depending on the temporal change (dv/dt) of the voltage at that time, and may adversely affect other apparatuses.

For a general, transformer-used, insulated DC-DC converter, such surge voltage is often a problem, and a countermeasure for the surge voltage is taken by providing a RC snubber for each of rectifier diodes. For other conventional examples, as illustrated in FIG. 10, Patent Document 1 discloses that a connection point g between a resonant capacitor Cz and a semiconductor switch Qz for resonant circuit control and a connection point h between a filter capacitor FC and a filter reactor Ld are connected via a snubber diode Ds to make a charging current flow in the resonant capacitor Cz when a surge voltage is generated, thereby suppressing such overvoltage. Other conventional examples of countermeasures for a surge voltage generated during recovery are disclosed in, e.g., Japanese Patent Laid-Open Publication No. 2006-352959 (Patent Document 2), Japanese Patent Laid-Open Publication No. 2009-273355 (Patent Document 3) and Japanese Patent Laid-Open Publication No. 2008-79403 (Patent Document 4).

The countermeasure disclosed in Patent Document 1 will be described below with reference to FIG. 10. FIG. 11 illustrates temporal change in operational waveforms in FIG. 10. The operation in FIG. 10 will be described with reference to FIG. 11. In FIG. 11, a waveform of a current Is flowing in a snubber diode Ds is added to the voltages and current waveforms illustrated in FIG. 8. Times t0 to t6 in FIG. 11 are similar to those in the case of FIG. 7 regardless of operation of the snubber diode Ds. At a time t5, a free-wheeling current Io flows in all rectifier diodes, and thus, a voltage between points e and f is almost zero.

Accordingly, charge in a resonant capacitor Cz is released through a free-wheel diode D9, and thus, a voltage at opposite ends of the resonant capacitor Cz is almost zero. At a time t5, semiconductor switches Q2 and Q3 are turned on, thereby a primary current Iab of a transformer gradually starts flowing, and thus, the free-wheeling current Io on the secondary side decreases.

At a time 6 when the current Io is zero, a voltage is generated between the points e and f on the secondary side of the transformer T, and the current Is starts flowing through the resonant capacitor Cz and the snubber diode Ds, Cz is charged until the time reaches a time t8, and a certain constant voltage, which is determined depending on the difference in potential between opposite ends of a filter reactor Ld in a filter circuit, is generated in the resonant capacitor Cz. The voltage of the resonant capacitor Cz is retained until the semiconductor switch Qz for resonant circuit control is turned on next time. The operation after the time t8 is similar to that in the case of FIG. 7 except a voltage Vz of the resonant capacitor Cz.

The snubber diode Ds forms a path for surge voltage suppression jointly with the resonant capacitor Cz. At the time t6 in FIG. 11, as in the circuit operation in FIG. 8, the rectifier diodes have a reverse recovery, resulting in a surge voltage being generated in the rectifier diodes, that is, between the points e and f. It is described that in this case, surge components can be absorbed by a path including the resonant capacitor Cz, the snubber diode Ds and the filter capacitor FC, thereby preventing generation of an excessive surge voltage.

The conventional example circuit illustrated in FIG. 10, in which the snubber diode Ds has been introduced, has three problems below. The first problem is that an amount of charge corresponding to the snubber current Is flowing in the resonant capacitor Cz remains in the resonant capacitor, resulting in reduction of a range of operation of the function that reduces turnoff loss.

The second problem is that the resonant capacitor Cz serves as both of two functions, i.e., a resonance capacitor and a snubber capacitor, and thus, two types of currents flow in the resonant capacitor Cz, increasing heat generated by the capacitor itself and thereby increasing the volume of the capacitor. The last problem is that where the resonant capacitor Cz becomes larger due to the aforementioned problem, the wiring inductance is increased, resulting in a decrease in the surge absorption function as a snubber circuit.

First, the first problem will be described. In an operation of the circuit illustrated in FIG. 10, if the voltage of the resonant capacitor Cz is not zero at the time t0 when the semiconductor switch Qz for resonant circuit control is turned on, that is, the resonant capacitor Cz has initially been charged as a result of absorbing a surge voltage will be described with reference to FIG. 12.

Solid lines in FIG. 12 indicate a case where the semiconductor switch Qz for resonant circuit control is turned on when the resonant capacitor Cz has not been charged, and dashed lines indicate a case where the semiconductor switch Qz for resonant circuit control is turned on when the resonant capacitor Cz has been charged. At a time t0, the semiconductor switch Qz for resonant circuit control is turned on, thereby the resonant current provided by a resonance reactor Lz and the resonant capacitor Cz start flowing, and an amplitude of the current is small if the resonant capacitor Cz has initially been charged. In FIG. 12, $I_{0m}$ is an amplitude of the current Iz when the resonant capacitor Cz has not initially been charged, $I_{1m}$ is an amplitude of a current Iz when the resonant capacitor Cz has initially been charged. There is the relationship indicated by expression (1) below between $I_{0m}$ and $I_{1m}$.

$$I_{1m} = (1-\alpha)I_{0m} \quad (1)$$

Here, α is a ratio of a voltage of the initially-charged resonant capacitor Cz to an output voltage of the rectifier diodes. $I_{0m}$ can be expressed by expression (2). However, Vef(t0) is an output voltage (between the points e and f) of the diode bridge at the time t0.

$$I_{0m} = \sqrt{\frac{C_z}{L_z}}\, V_{ef}(t_0) \quad (2)$$

If the resonant current Iz is insufficient, the current Iab cannot be lowered to around zero at a time t2. Subsequently, at a time t3, the semiconductor switches Q1 and Q4 on the primary side is turned off, resulting in large turnoff loss being generated in the semiconductor switches Q1 and Q4 compared to a case where the current is around zero.

FIG. 13 illustrates waveforms when the circuit that normally operates in FIG. 7 with the snubber diode Ds in FIG. 10 added thereto is put into actual operation. Merely the resonant capacitor Cz has a voltage (around ⅙ of a resonance peak voltage) in advance before operation of a resonance switch at a time t0, and there is no time t2 when the current Iab becomes around zero, and thus, switching loss occurs.

The occurrence of switching loss naturally lowers a drive frequency, providing a restriction on reduction in size of the transformer T. Also, introduction of the snubber diode Ds to the circuit capable of normally decreasing switching loss provides conditions for disabling the operation of the circuit, narrowing the range of an input voltage and/or an output current, that is, an operational range of the DC-DC converter.

In order to expand the narrowed operational range, it is necessary to increase an electrostatic capacitance of the resonant capacitor Cz so that I1m is larger than the value of the current Iab when the semiconductor switches Q1 and Q4 are turned off in FIG. 12. This is related to the second problem of heat generation of the resonant capacitor Cz. It should be noted that the resonance reactor Lz includes a leakage inductance of the transformer T and thus, it is difficult to reduce the resonance reactance Lz from the perspective of manufacturing.

Next, the second problem will be described. The resonant capacitor Cz is a circuit that also serves as a snubber capacitor. Thus, two types of currents, i.e., a resonant current and the snubber current Is, flow in the resonant capacitor Cz. In other words, the current Iz in FIG. 11 is a sum of the components of the current Iz, which the resonant current in FIG. 8, and the components of the current Is in the snubber circuit in FIG. 11, and thus, high-frequency components of the current Iz in FIG. 11 are larger than those of the current Iz in FIG. 8.

Heat generated by a capacitor increased in proportion to a square of an effective current value provided by an inner resistor and a square root of a frequency due to a skin effect. As in the present DC-DC converter, for a physical size (volume) of the resonant capacitor Cz that operates with a high frequency, heat generation is dominant rather than an electrostatic capacitance necessary for resonance. As described above, there is the problem of the heat generated by the resonant capacitor Cz being increased due to an increase in high-frequency components of the current Iz by the snubber current Is and the volume of the resonant capacitor Cz being also increased in proportion to the increase in the heat.

Furthermore, capacitors are elements sensitive to heat, and thus, are adversely affected in terms of lifetime if used at high temperature. Furthermore, an increase in electrostatic capacitance of the resonant capacitor Cz for expanding the operational range, which has been referred to as a solution to the first problem, leads to an increase in effective current value according to expression (2), which substantially increases the volume of the resonant capacitor Cz.

Lastly, the third problem will be described. When the heat generated by the resonant capacitor Cz is large, a space for cooling is required. In that case, the wiring inductance of the resonant capacitor Cz inevitably increases. In particular, such increase is significant in the case of large power. An effect of the wiring inductance on the snubber circuit that suppresses a surge voltage will be described.

At the time t6 in FIG. 11, a stepped voltage Vcd is generated at the output points e and f of the rectifier diode bridge, together with a surge voltage generated by recovery of the rectifier diodes. FIG. 14 illustrates an equivalent circuit of a path of a surge current flowing through the snubber circuit where such time is newly set to t=0 on a temporal axis and $V_2$ is a voltage. Temporal change of the snubber current Is in this case can be expressed by expression (3) below:

$$I_s = \sqrt{\frac{C_z}{L_s}}\, V_2 \sin\frac{1}{\sqrt{L_s C_z}} t \quad (3)$$

provided that, $$0 \leq t \leq \sqrt{L_s C_z}\, \pi$$

(Effective for surge voltage absorption only during a first semi-cycle).

Here, Cz is a capacitance of the resonant capacitor, and Ls is a wiring inductance of a wiring of the snubber current path and a wiring inside the circuit elements. For example, the path of the snubber current Is in the case of FIG. 10 runs from the output point e of the rectifier diode bridge, passes though the resonant capacitor Cz, and further runs from the point g to the point f though the snubber diode Ds, a point h, and only the filter capacitor FC in the filter circuit 102, and returns to the point e through the diode bridge.

FIG. 15 illustrates temporal change of the snubber current Is flowing in the snubber circuit due to change of the wiring inductance Ls when the capacitance of the resonant capacitor Cz and the surge voltage generated by recovery in the circuit in FIG. 14 are constant. Here, where the wiring inductance Ls is L1, L2 or L3, there is a relationship of L1<L2<L3 as illustrated in FIG. 15.

In order to absorb a surge voltage generated by recovery of the rectifier diodes, it is necessary to make a large snubber current Is flow in the snubber circuit 105 immediately after generation of the voltage. It can be seen from FIG. 15 that as the wiring inductance Ls is larger, the current at t=0 when a surge voltage is generated has slower rising and thus is slower to increase. This measure can be understood from the inclination of the current waveform. Expression (4) below indicates temporal differentiation of expression (3).

$$\frac{dI_s}{dt} = \frac{V_2}{L_s}\cos\frac{1}{\sqrt{L_sC_z}}t \quad (4)$$

It can be understood from expression (4) that as the wiring inductance Ls is larger, the inclination of the current at time t=0 when a surge voltage is generated is smaller. Also, the inclination does not depend on the capacitor capacitance Cz. In other words, as the wiring inductance Ls is larger, the surge voltage absorption deteriorates, resulting in deterioration of the function as a snubber circuit. This indicates that an overvoltage generated by recovery of the rectifier diodes and ringing of such voltage cannot be prevented and the circuit including the snubber diode Ds has no meaning. Even though the wiring inductance Ls is large and the function of the snubber circuit deteriorates, V2 does not become zero, and thus, the snubber current Is continues flowing as illustrated in FIG. 14 according to expression (3). Accordingly, an effective value of the snubber current Is is somewhat smaller in inverse proportion to a square root of the wiring inductance Ls, but the resonant capacitor Cz is charged and thus, there is no change in terms of the first problem.

A principal cause of the above problem lies in that one capacitor Cz has two functions as a resonant capacitor for making a resonant current flow in order to reduce turnoff loss of the semiconductor switches on the primary side of the transformer T, and a capacitor for a snubber circuit for absorbing a surge voltage generated when the rectifier diode bridge on the secondary side of the transformer T recovers.

In other words, the electrostatic capacitance of the capacitor Cz is determined by an amplitude of the resonant current Iz made to flow to reduce the current Iab, which is a main purpose, and a period of resonance with the resonance reactor Lz that is dominated by the leakage inductance of the transformer T. In the conventional example circuit in FIG. 10, as is clear from expression (3), the snubber current Is in the snubber path has a larger effective value as the capacitor Cz is larger. It is undesirable to make an excessive snubber current Is flow in the capacitor Cz to absorb a surge voltage. In other words, it is important that only a current for the surge absorption function is made to flow in the snubber capacitor and no extra current is made to flow in the capacitor.

SUMMARY OF THE INVENTION

In order to solve the above problems, a DC power supply according to the present invention includes a circuit in which a DC power source and a primary winding of a transformer are connected via a power conversion circuit including a semiconductor switch that includes a free-wheel diode, the DC power source that supplies power from a filter capacitor to a load through a rectifier diode bridge circuit and a filter circuit that includes a filter reactor and the filter capacitor is provided with a resonance reactor on an output side of a secondary winding of the transformer, a resonant switch circuit including a parallel circuit of a diode and a semiconductor switch and a resonant capacitor is connected in parallel to an outside side of the rectifier diode bridge circuit, and a serial resonant circuit including the resonance reactor and the resonant capacitor in the resonant switch circuit is provided, wherein a function that upon generation of a surge voltage due to recovery of the rectifier diode, absorbs the surge voltage is provided by the parallel circuit of the diode and the semiconductor switch diode connected to the output of the rectifier diode bridge circuit, and a circuit including a snubber capacitor, a snubber diode and a diode for discharging the snubber capacitor, which is independent from the resonant switch circuit including the resonant capacitor and the resonance reactor is provided.

Alternatively, the circuit including the snubber capacitor and the diode, which absorbs the surge voltage, may further include a resistor that absorbs energy of the surge voltage.

Furthermore, a wiring of a path for absorption of the surge voltage may be provided so as to provide a minimum inductance.

Furthermore, the snubber capacitor may be set to have an electrostatic capacitance necessary for absorption of a surge voltage generated by recovery of the rectifier diode.

Furthermore, a leakage inductance of the transformer and an inductance of a wiring included in a resonant circuit may be used for the resonance reactor of the serial resonant circuit.

Furthermore, a function that turns off the semiconductor switch in the power conversion circuit on the primary side of the transformer when a current flowing in the semiconductor switch in the current conversion circuit is substantially zero may be provided.

Furthermore, on/off control of the semiconductor switch in the power conversion circuit and the semiconductor switch in the resonant circuit may be controlled by a gate controller.

The present invention enables simultaneous provision of two advantages of reducing switching loss in a semiconductor switch on a primary side of a transformer and reducing a surge voltage generated by recovery of a rectifier diode on a secondary side of the transformer in a transformer-used, insulated DC-DC converter.

Furthermore, a resonant capacitor and a snubber capacitor are made to be independent from each other, enabling reduction of unnecessary current, such as one flowing in a conventional resonant capacitor, and suppression of heat generation.

These lead to enhancement of the lifetime of the DC-DC converter, reduction in size and enhancement in reliability of the entire device, and reduction of unnecessary high-frequency noise. Furthermore, since the electrostatic capacitance of the capacitor and the degree of freedom of arrangement in the device are also enhanced, enabling enhancement of the electrical and mechanical performance of the device.

DETAILED DESCRIPTION OF THE PREFERRED EMBODIMENTS

Figure 10:
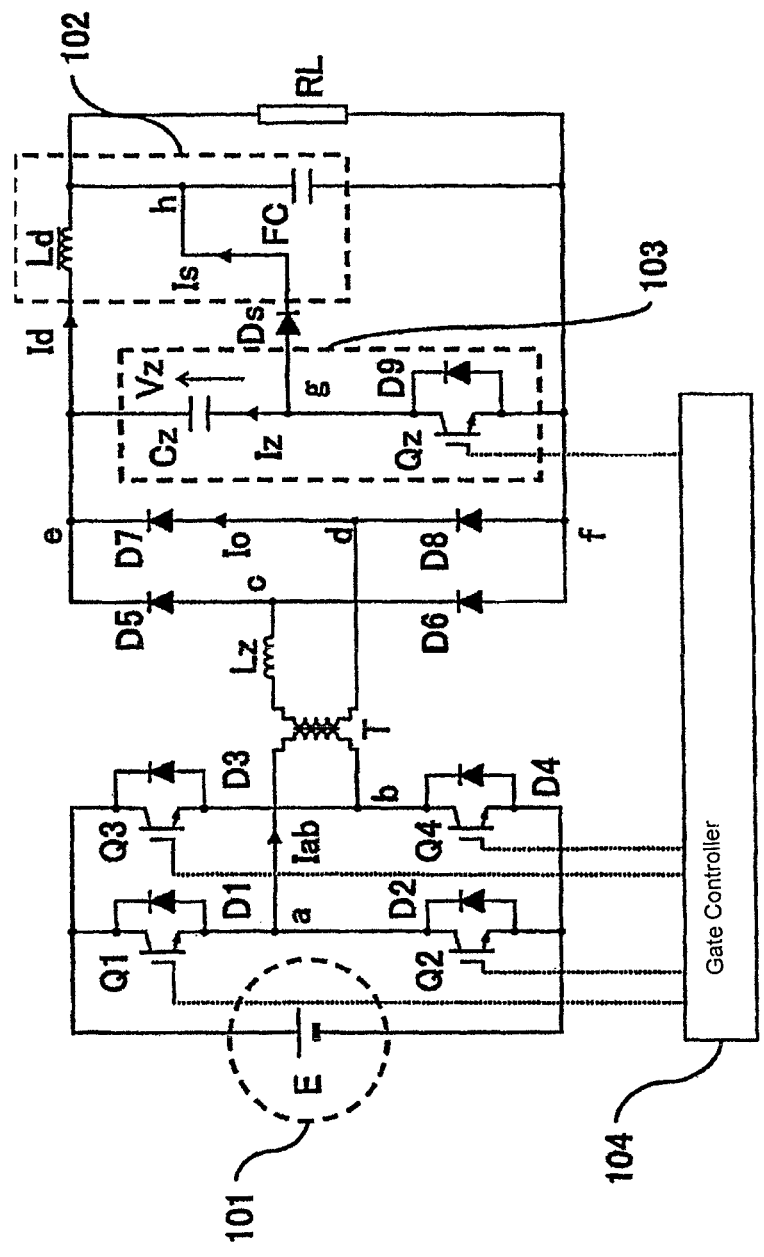
FIG. 10 illustrates a circuit configuration in another conventional example in Patent Document 1, in which a snubber diode Ds has been introduced.
Figure 11:
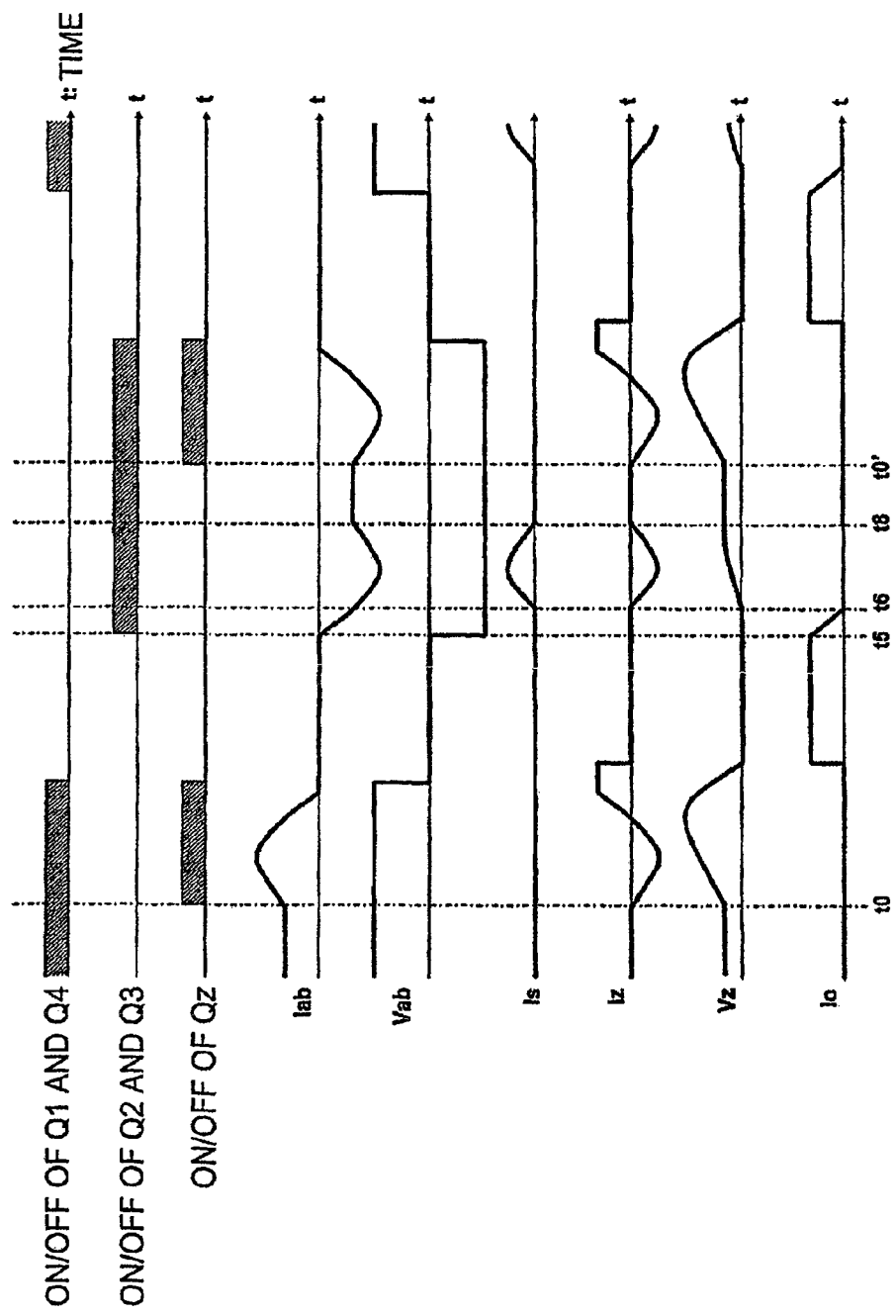
FIG. 11 illustrates temporal change of voltages and currents in FIG. 10 and semiconductor switch instructions.
Figure 12:
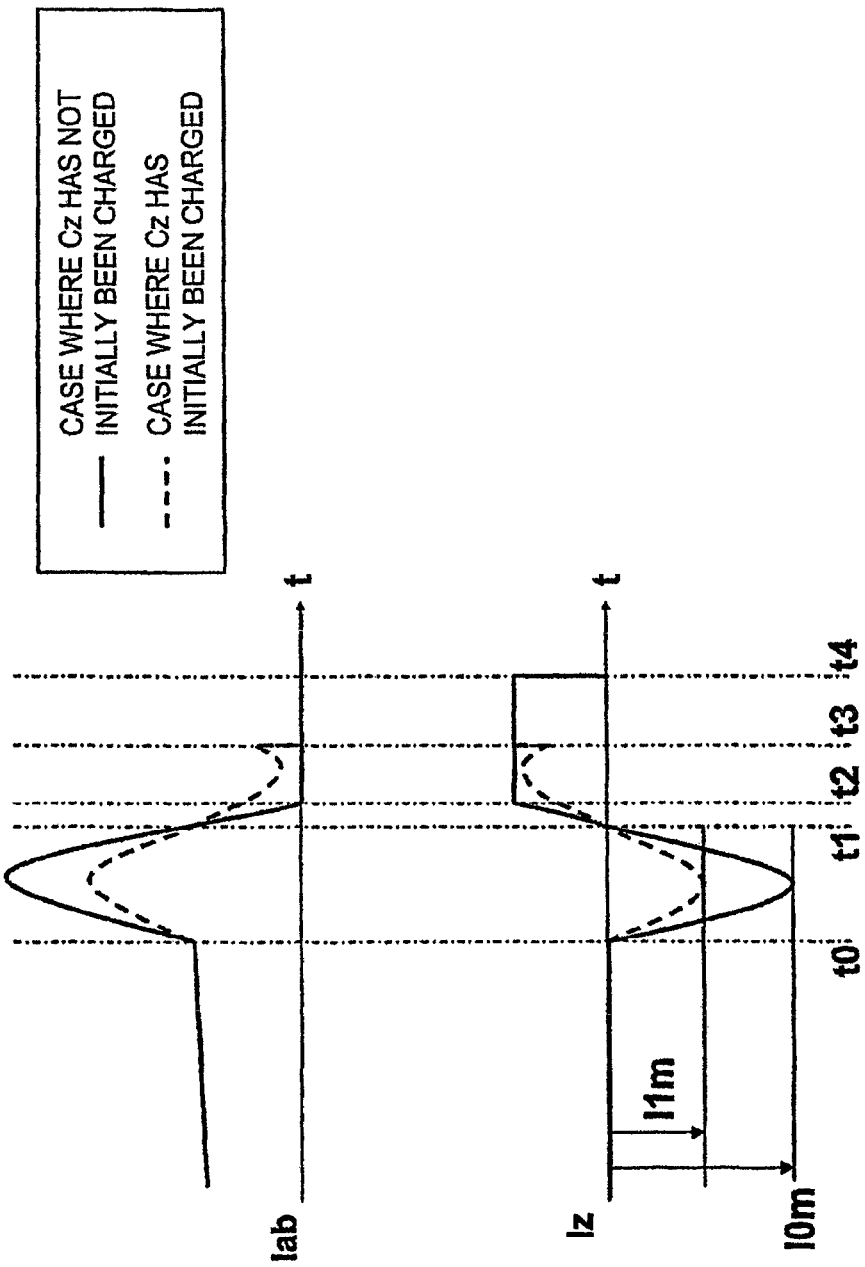
FIG. 12 illustrates a resonant current Iz and a primary current Iab of a transformer regarding whether or not a resonant capacitor Cz has an initial voltage.
Figure 13:
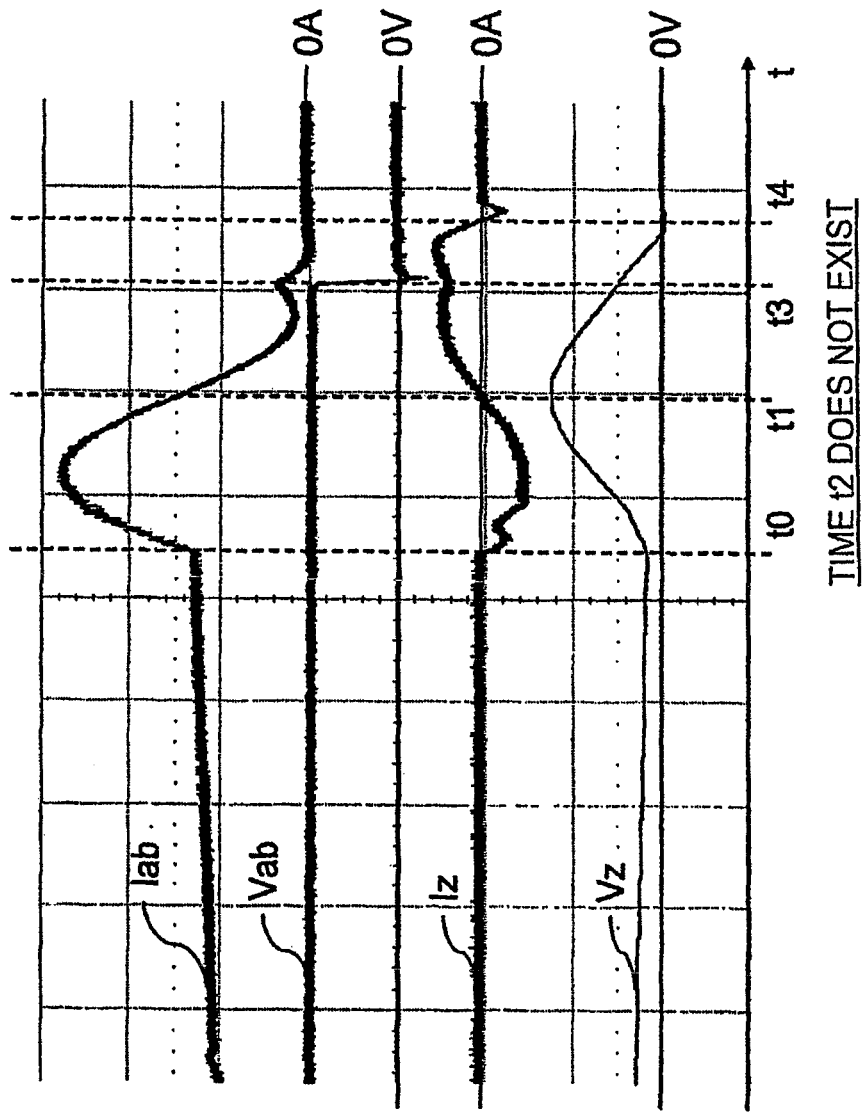
FIG. 13 illustrates actually-measured voltage and current waveforms, which cause problems in a countermeasure circuit configuration in the conventional example.
Figure 14:
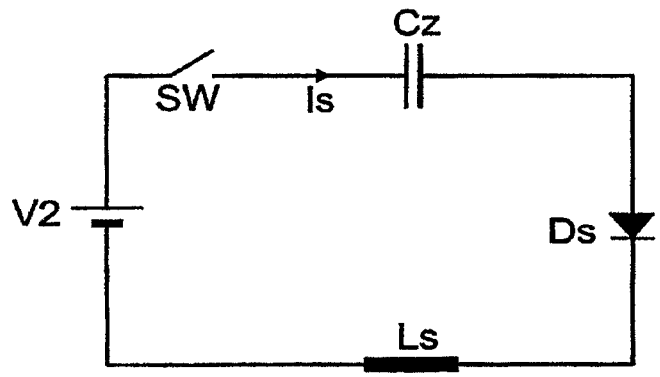
FIG. 14 illustrates an equivalent circuit of a path in which a snubber current Is flows during surge absorption.
Figure 15:
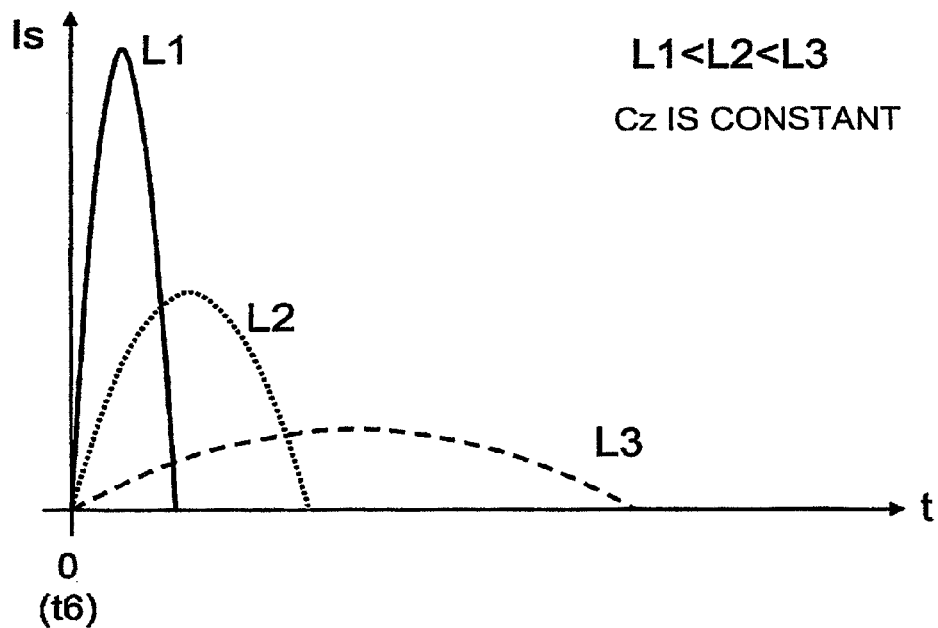
FIG. 15 illustrates change of the snubber current Is according to inductances of the path.

The present invention solves the aforementioned three problems by independently providing a resonant capacitor and a snubber capacitor, not providing both a resonance function and a snubber function to one and same capacitor as in the other conventional example in FIG. 10. Embodiments of the present invention will be descried with reference to the drawings.

First Embodiment

Hereinafter, a configuration of a first embodiment of the present invention will be described below with reference to FIG. 1. Reference numeral 101 denotes an input DC power source, reference numeral 102 denotes a filter circuit including a filter reactor Ld and a filter capacitor FC, reference numeral 103 denotes a resonant switch circuit, reference numeral 104 denotes a gate controller for respective semiconductor switches, and reference numeral 105 denotes a snubber circuit. Reference numerals Q1 to Q4 denote semiconductor switches included in an inverter circuit, and free-wheel diodes D1 to D4 are attached to the respective semiconductor switches.

A primary winding of the transformer T is connected between a connection point a between the semiconductor switches Q1 and Q2 and a connection point b between semiconductor switches Q3 and Q4, a secondary winding of the transformer T is connected to connection points c and d in a bridge including rectifier diodes D5 to D8. An output of the bridge is provided to a load RL via the filter circuit 102.

The gate controller 104 gives on/off instructions to the semiconductor switches Q1 to Q4 and a semiconductor switch Qz for resonant circuit control, respectively. While the semiconductor switches may be bipolar transistors, MOSFETs, thyristors, gate turnoff thyristors, IGBTs or the like, here, a description will be provided using IGBTs as a representative example.

Figure 1:
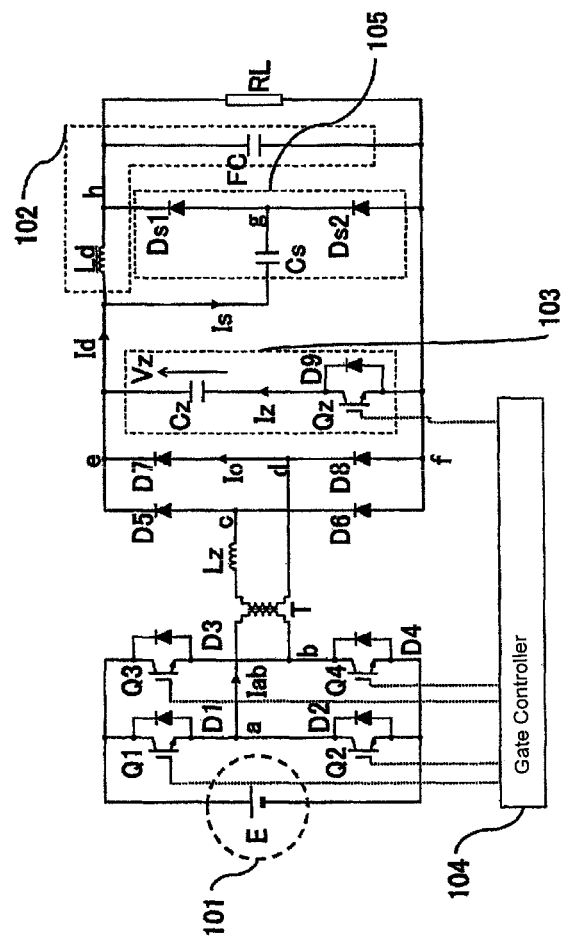
FIG. 1 illustrates a DC power supply according to a first embodiment of the present invention.

In the configuration illustrated in FIG. 1, a resonance reactor Lz is a sum of a leakage inductance of the transformer T and an inductance of a wiring, and forms a serial resonant circuit jointly with a resonant capacitor Cz in the resonant switch circuit 103.

The resonant switch circuit 103, which includes the capacitor Cz that can be controlled by the semiconductor switch Qz for resonant circuit control, is connected in series to points e and f on the output side of the rectifier diodes D5 to D8. More specifically, the resonant switch circuit 103 is a circuit in which the semiconductor switch Qz for resonant circuit control, to which a free-wheel diode D9 is connected in inverse-parallel thereto, and the resonant capacitor Cz are connected in series. The resonant switch circuit 103 is interposed between the output side of the bridge rectifier circuit and the filter circuit 102 in parallel to the rectifier diode bridge circuit.

Furthermore, a midpoint h between the filter reactor Ld and the filter capacitor FC in the filter circuit 102 and the point f are connected in series by means of serial connection between a snubber diode Ds1 and a discharge diode Ds2, and g is a midpoint between the snubber diode Ds1 and the discharge diode Ds2. Furthermore, the snubber circuit 105 in which the output point e in the rectifier diode bridge and the point g are connected by means of a snubber capacitor Cs is added. The snubber circuit 105 serves to absorb a surge voltage generated when the rectifier diodes recover.

Figure 2:
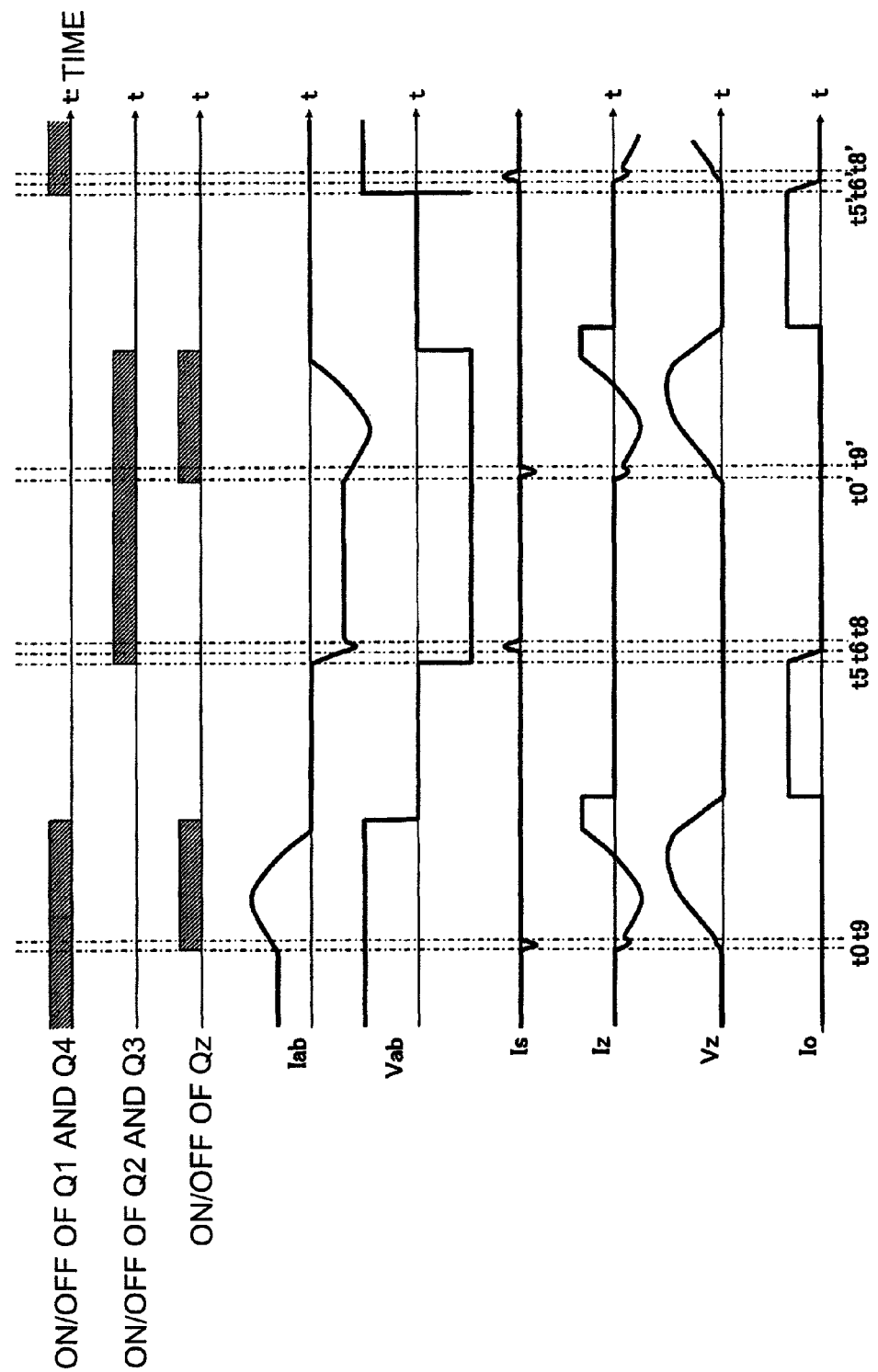
FIG. 2 illustrates temporal change of ideal voltage and current waveforms and semiconductor switch instructions in the present invention.

FIG. 2 illustrates temporal change of operational waveforms for describing the embodiment in FIG. 1. The basic operation is identical to the example described with reference to FIG. 7 in the Description of the Related Art section, and differences from that the FIG. 7 example will be described. Here, Iz is a resonant current flowing in the resonant circuit, Io is a free-wheeling current free-wheeling from and back to the bridge rectifier circuit through the filter circuit 102 and the load RL, and additionally, Is is a snubber current in the snubber capacitor Cs.

It is assumed that an on signal is provided from the gate controller 104 to each of the semiconductor switches Q1 and Q4, whereby the semiconductor switch Q1 and Q4 in the inverter circuit are conductive. A primary current Iab flowing between the points a and b flows, whereby energy is conveyed from the input DC power source 101 to the load RL. Also, at this time, the snubber capacitor Cs absorbs a surge voltage and thereby charged.

In a circuit operation, as in the conventional example, at a time t0 before turning off the semiconductor switches Q1 and Q4 in the inverter circuit, a signal to turn on the semiconductor switch Qz for resonant circuit control in the resonant switch circuit 103 is provided from the gate controller 104 to turn on the semiconductor switch Qz for resonant circuit control. At that time, first, the snubber capacitor Cs discharges, and the current therefrom flows into the resonant capacitor Cz through the diode Ds2 for discharging the snubber capacitor Cs; however, the snubber capacitor Cs has a small capacitance compared to that of the resonant capacitor Cz, and immediately, at a time t9, the discharge of the snubber capacitor Cs is completed and the snubber current Is returns to zero.

Subsequently, a charge current from the input DC power source 101 flows into the resonant capacitor Cz. This resonant current Iz is a sum of the discharge current from the snubber capacitor Cs and a serial resonant current between the resonance reactor Lz and the resonant capacitor Cz. The subsequent operation is completely identical to that of the conventional example until such operation reaches an operation mode at a time t6.

At a time t5, the semiconductor switches Q2 and Q3 are turned on, thereby the primary current Iab in the transformer T gradually starts flowing, and thus, the free-wheeling current Io on the secondary side decreases. At the time t6 when the free-wheeling current Io becomes zero, a stepped voltage is generated between the points e and f on the secondary side of the transformer T, and simultaneously with that, the rectifier diodes D5 and D8 recover, and a surge voltage is superimposed on the stepped voltage.

Here, until the time reaches a time t8, a snubber current Is for charge flows into the snubber capacitor Cs through the snubber capacitor Cs and the snubber diode Ds1, and the surge voltage generated as a result of the diode recovery is thereby absorbed. A voltage of the resonant capacitor Cz is not affected by the operation of the snubber circuit 105 and remains zero. At a time t0', as at the time t0, during the semiconductor switches Q2 and Q3 in the power conversion circuit on the primary side of the transformer T, the semiconductor switch Qz for resonant circuit control is turned on. Here, the snubber capacitor Cs starts discharging as in the operation at the time t0, and thereafter, the above-described operation is repeated.

As described above, the snubber current Is in the snubber circuit 105 is small because the snubber capacitor Cs is small compared to the resonant capacitor Cz. Thus, an effect of the snubber current Is imposed on the resonant current Iz used for reducing switching loss in the semiconductor switches in the power conversion circuit connected to the primary side of the transformer T is small so that such effect can be ignored, compared to that of the conventional example.

Furthermore, in order to make the snubber circuit 105 effectively operate, it is necessary to provide a wiring of a path running from the output point e of the rectifier diode bridge, passing through the snubber capacitor Cs, and further passing from the point g to the point f through the snubber diode Ds1, the point h and only the filter capacitor FC in the filter circuit 102, and then returns to the point e through the rectifier diode bridge, which is a path of the snubber current Is flowing at the time of surge voltage absorption, so that an inductance of the wiring is as small as possible.

For example, a current in a path from the output point e of the rectifier diode bridge to the filter capacitor FC through the snubber capacitor Cs, the point g and the snubber diode Ds1, and a current in a path from the filter capacitor FC to the point f in the rectifier diode bridge may be opposed to each other to form a to-and-fro path.

Figure 3:
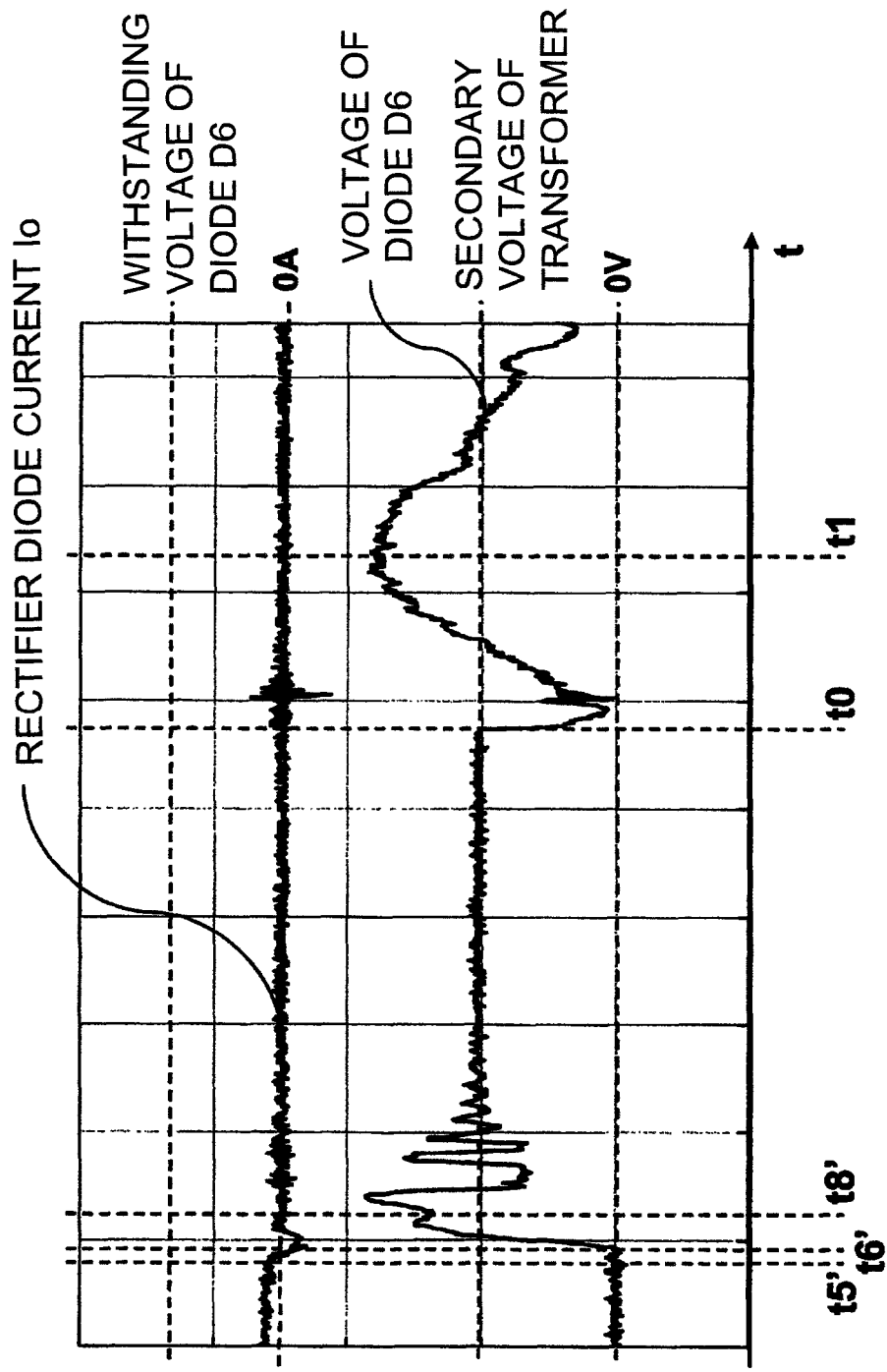
FIG. 3 illustrates actually-measured voltage and current waveforms when a diode D6 recovers in a configuration of the present invention.
Figure 7:
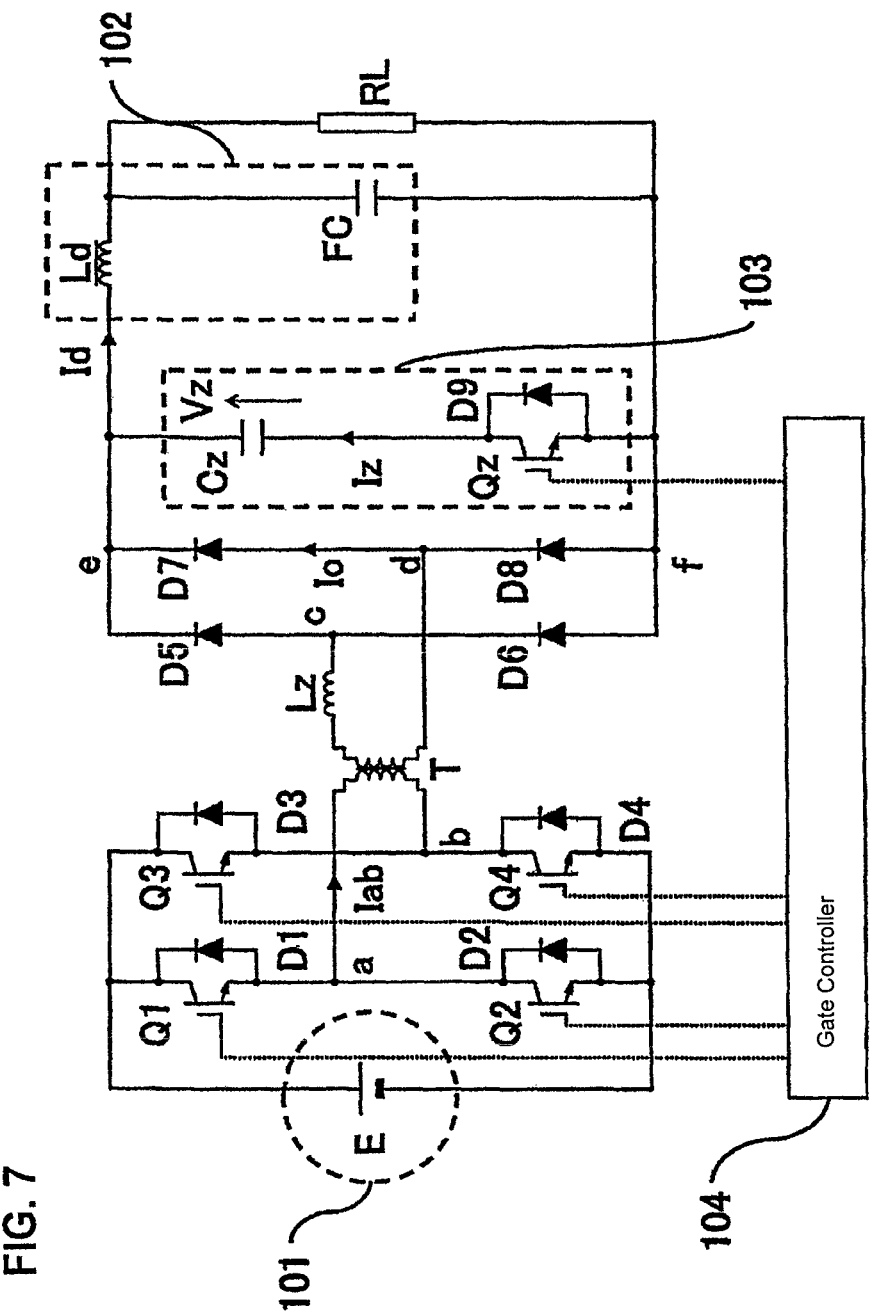
FIG. 7 illustrates a circuit configuration of a conventional example in Patent Document 1 and Non-Patent Document 1.
Figure 8:
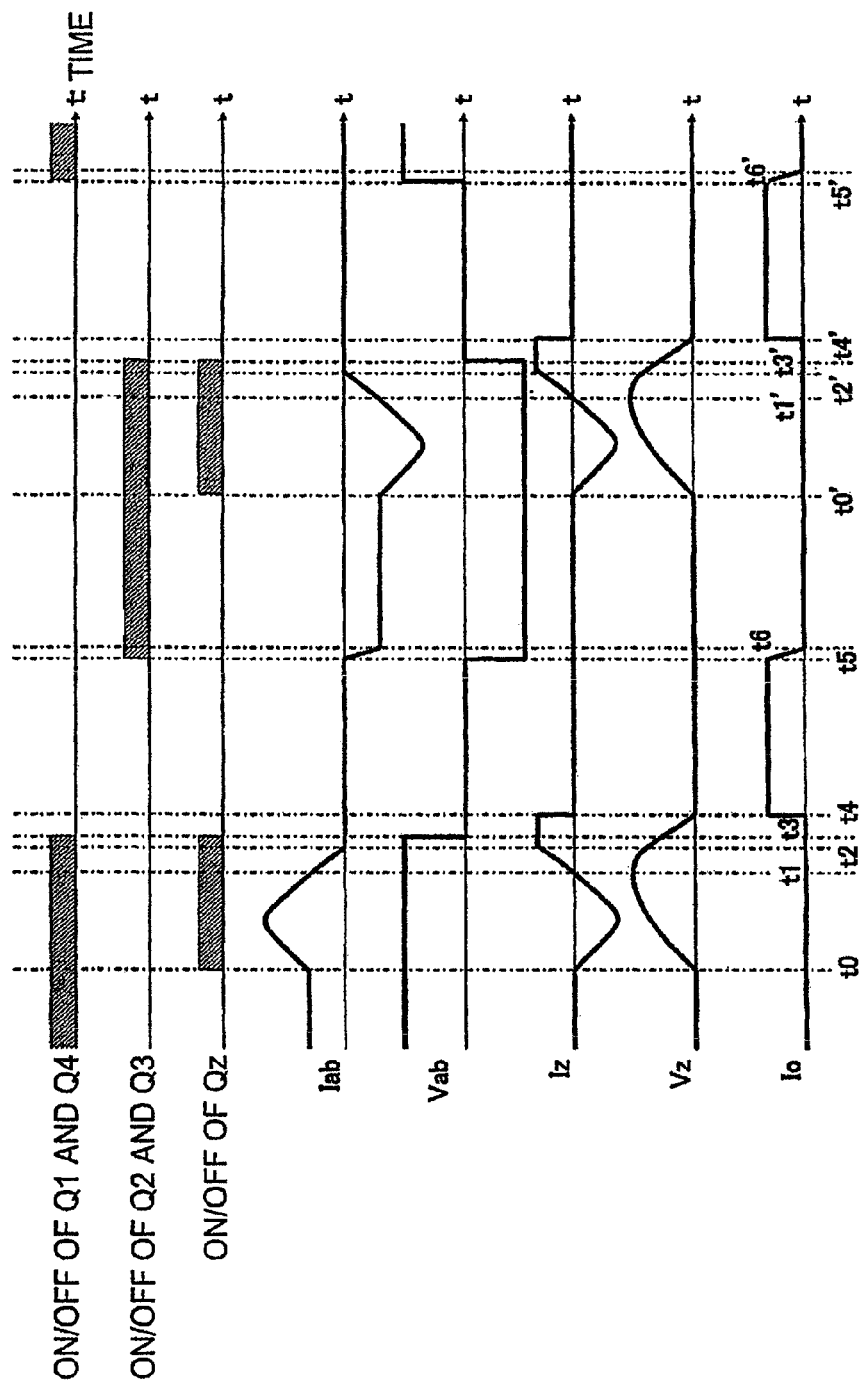
FIG. 8 illustrates temporal change of ideal voltage and current waveforms and semiconductor switch instructions in the conventional example.
Figure 9:
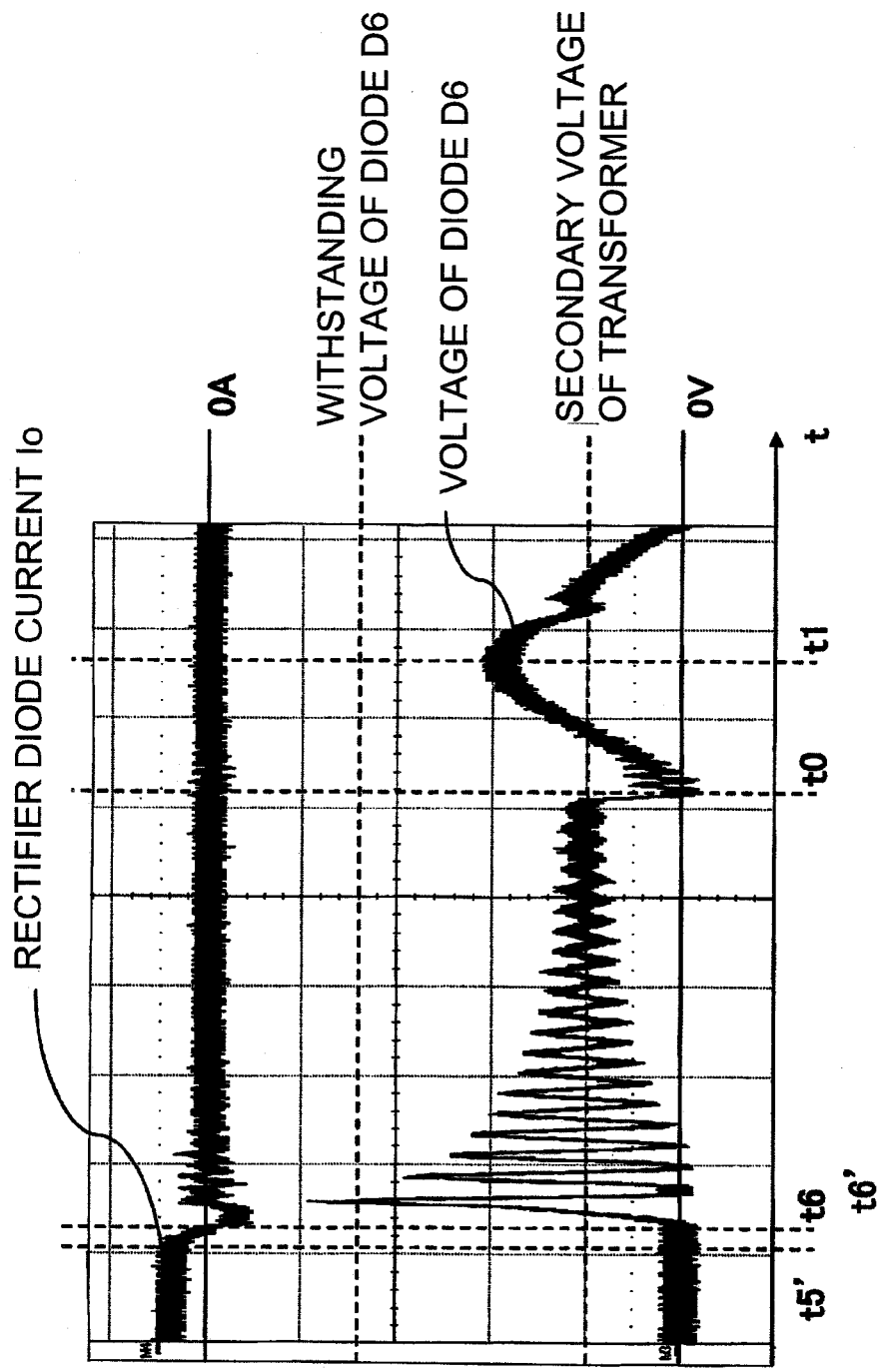
FIG. 9 illustrates actually-measured voltage and current waveforms when the diode D6 recovers in the configuration in FIG. 2.

FIG. 3 illustrates measured waveforms in the circuit in the present invention, compared to the measured voltage and current waveforms during recovery of the rectifier diodes in the FIG. 7 configuration, which are illustrated in FIG. 9. Here, the capacitance of the resonant capacitor Cz is set to 4 µF, and the capacitance of the snubber capacitor Cs is set to 0.4 µF, which is one-tenth of the capacitance of the resonant capacitor Cz.

A surge voltage generated by recovery of the rectifier diode bridge can be suppressed to a level of a peak of a resonance voltage generated by the resonant switch circuit 103. As described above, the snubber capacitor Cs can serve as a capacitor for the snubber circuit, with a capacitance that is around one-tenth of that of the resonant capacitor Cz.

Second Embodiment

Figure 4:
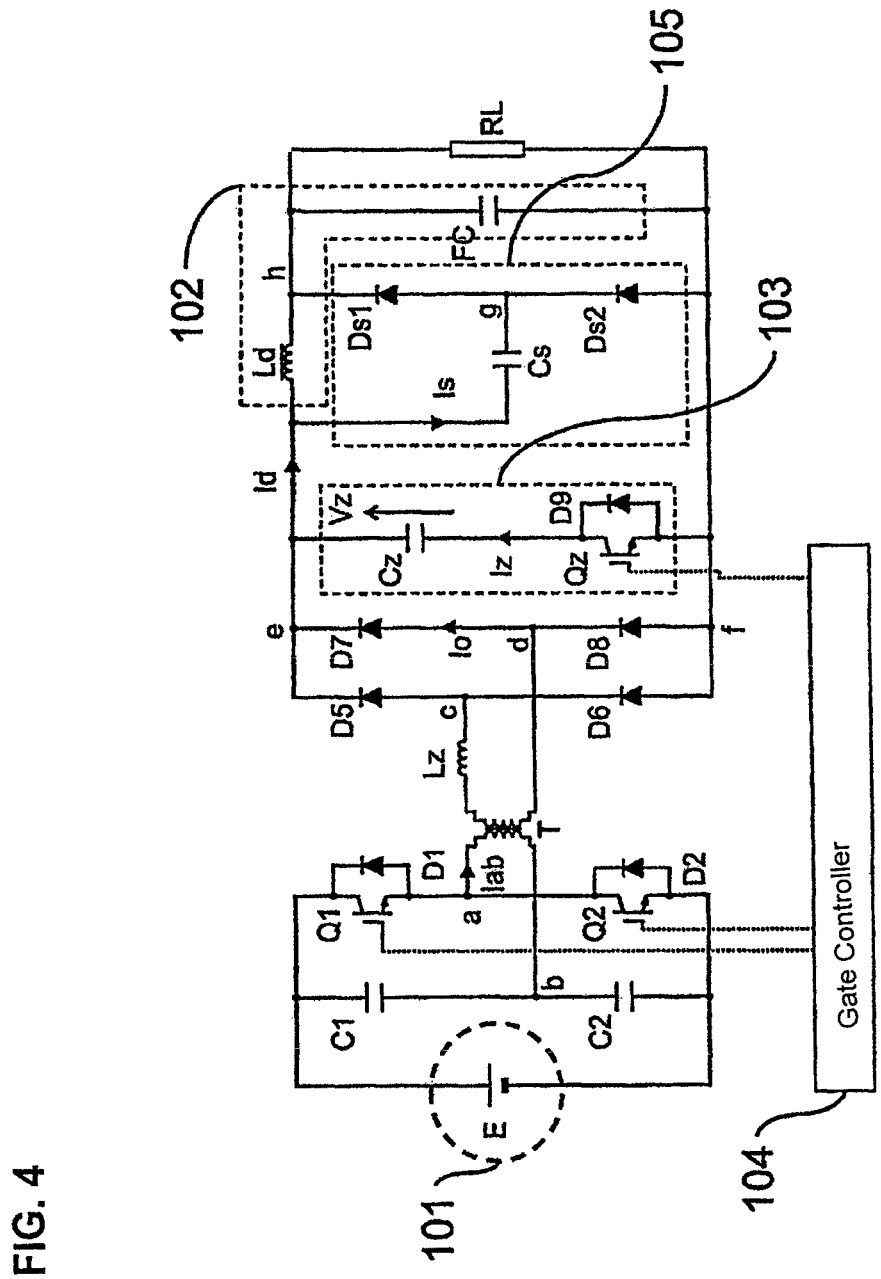
FIG. 4 illustrates a case where a primary side of the transformer includes a two-level half-bridge, as a second embodiment of the present invention.
Figure 5:
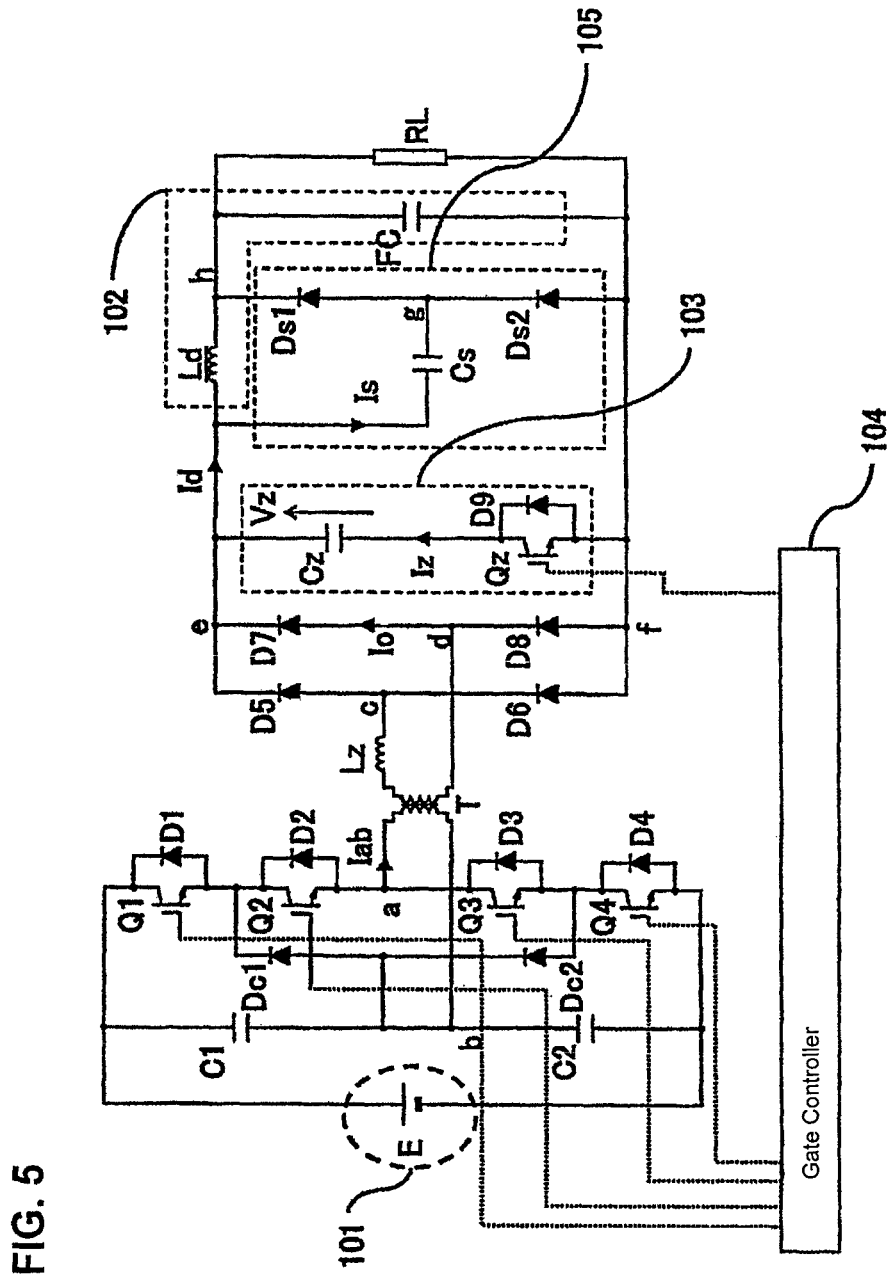
FIG. 5 illustrates a case where a primary side of the transformer includes a three-level half-bridge, as the second embodiment of the present invention.

Also, the present invention can also be carried out in the modes illustrated in FIGS. 4 and 5. These modes are examples in which the configuration of semiconductor switches on the primary side forms a half bridge in FIG. 4 and forms a multilevel configuration (here, a three-level circuit) in FIG. 5. In these modes, only operation of semiconductor switches in a power conversion circuit is different from that of the first embodiment, and operation for switching loss reduction, a principle of a snubber circuit and waveforms after an input to a transformer are the same as those in the first embodiment.

Voltage-dividing capacitors C1 and C2 connected to an input DC power source voltage E are capacitors having capacitances equal to each other, the capacitors dividing the input DC power source voltage E, and are introduced to produce a power source voltage E/2. In the present embodiment, the transformer T is driven with E/2. Also, Dc1 and Dc2 in the power conversion circuit on the primary side of the transformer T are clamp diodes.

Third Embodiment

An inductance of a path for recovery of rectifier diodes may include a leakage inductance of a transformer T, a wiring inductance and a resonance reactor. As these inductances are larger, magnetic energy stored therein is also larger, resulting in an increase in surge voltage caused by recovery of the rectifier diodes, and ringing of the surge voltage with a junction capacitance of the rectifier diodes.

Figure 6:
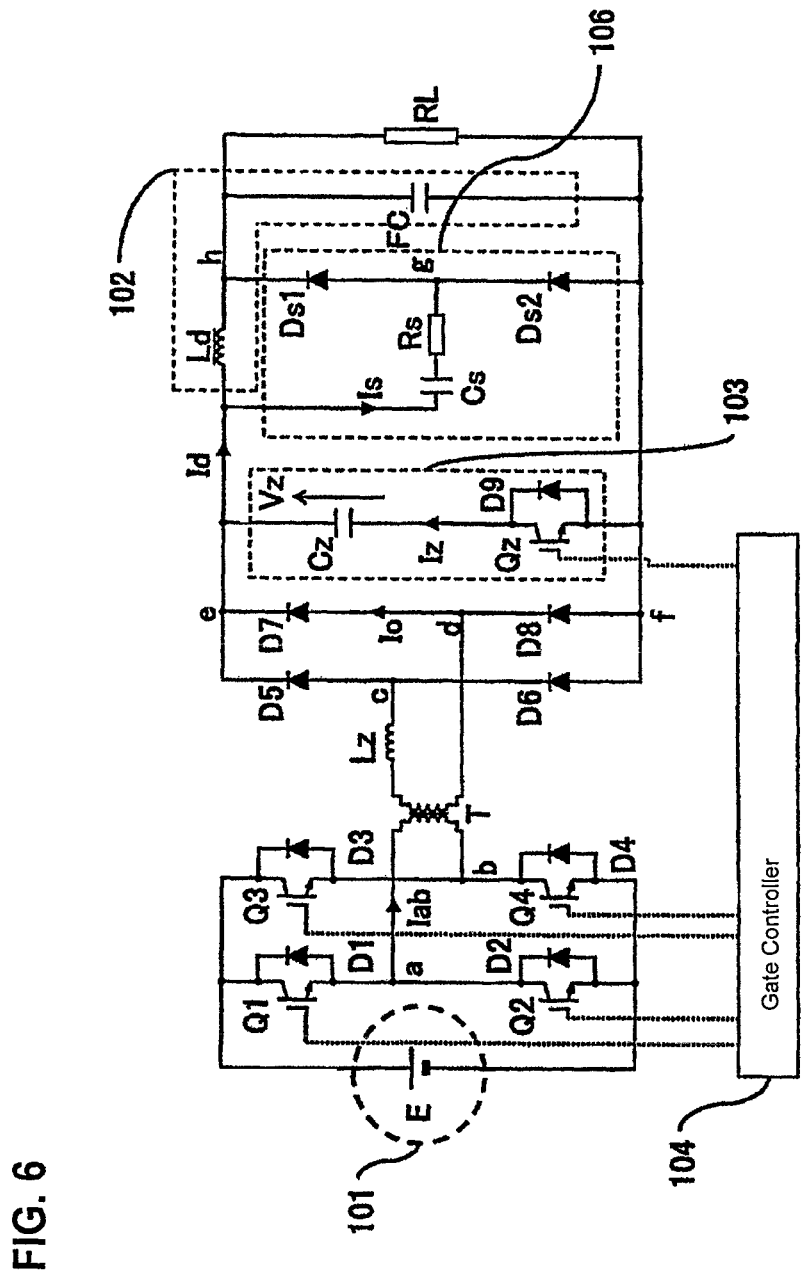
FIG. 6 illustrates a case where a snubber circuit 106 formed by introducing a damping resistor Rs to a snubber circuit 105 has been introduced, as a third embodiment of the present invention.

In order to such situation, a snubber circuit 106 including a damping resistor Rs, in which the damping resistor Rs is connected in series to a snubber capacitor Cs, which is illustrated in FIG. 6, is formed. Consequently, such energy is absorbed by the damping resistor Rs, enabling the surge voltage and the ringing to be immediately reduced. Furthermore, although in the first embodiment, energy absorbed by the snubber capacitor Cs flows to the load on the secondary side, such energy can be absorbed by the damping resistor Rs even if the energy cannot be sent to the load on the secondary side, and thus, the present embodiment is effective.

A resistance value of the damping resistor Rs is determined based on a wiring inductance Ls of a snubber current path and the snubber capacitor Cs a so as to satisfy expression (5) below.

A circuit operation in this case is also the same as that in the first embodiment.

$$R_s^2 - \frac{4L_s}{C_s} \geq 0 \qquad (5)$$

What is claimed is:

1. A DC power supply comprising: a DC power source; a power conversion circuit capable of generating an alternate current from a direct current; a primary winding of a transformer, the primary winding being connected to an output of the power conversion circuit; a secondary winding of the transformer; a rectifier diode bridge circuit connected to the secondary winding; and a filter circuit including a filter reactor and a filter capacitor, the filter circuit being connected to an output side of the rectifier diode bridge circuit, wherein a resonance reactor is provided on an output side of the secondary winding, and wherein a resonant switch circuit including a parallel circuit comprised of a diode and a semiconductor switch, configured for resonant circuit control, and further including a resonant capacitor is connected to the output side of the rectifier diode bridge circuit in parallel to the rectifier diode bridge circuit, whereby a serial resonant circuit comprised of the resonance reactor and the resonant capacitor in the resonant switch circuit is formed, wherein an orientation of the diode comprising the resonant switch circuit is a forward direction in an orientation from negative to positive of the rectifier diode bridge circuit being connected in parallel, the DC power supply further comprising a snubber circuit that includes a snubber diode and a diode for discharging a snubber capacitor connected in series and is connected in parallel to the filter capacitor in the filter circuit, wherein the snubber capacitor is connected to an output point of the rectifier diode bridge circuit via a midpoint between the snubber diode and the diode for discharging the snubber capacitor connected in series, wherein, when the semiconductor switch for controlling the serial resonant circuit of the resonant switch circuit is turned on, the discharging of the snubber capacitor and a charging of the resonant capacitor are started, and thereafter, the charging and discharging of the resonant capacitor is continued even after the discharging of the snubber diode is terminated, a semiconductor switch of the power conversion circuit on a primary side of the transformer is turned off, when a discharge current of the resonant capacitor becomes equal to a load current, and a snubber current for charging is made to flow to the snubber capacitor, via the snubber capacitor and the snubber diode, when a free-wheeling current of a secondary side of the transformer becomes zero.

2. The DC power supply according to claim 1, wherein the snubber diode, the diode for discharging the snubber capacitor, and the snubber capacitor, which are components of the snubber circuit, are provided in a parallel circuit independent from the resonant switch circuit.

3. The DC power supply according to claim 1, wherein in order to enhance performance of the snubber circuit, a resistor is connected in series to the snubber capacitor.

4. The DC power supply according to claim 1, wherein an electrostatic capacitance of the snubber capacitor is set to be no larger than one-tenth of an electrostatic capacitance of the resonant capacitor.

5. The DC power supply according to claim 1, wherein a wiring of a path running from the output point of the rectifier diode bridge circuit, passing through the snubber capacitor and the snubber diode and returning to the output point of the rectifier diode bridge circuit via the filter capacitor, the wiring being included in a circuit for a current for absorbing a surge voltage generated in the rectifier diode bridge circuit, has an inductance of no higher than 1 µH.

6. The DC power supply according to claim 1, wherein on/off control of the semiconductor switch on the primary side of the transformer in the power conversion circuit and the semiconductor switch in the resonant switch circuit is performed by a gate controller.

7. The DC power supply according to claim 1, wherein the resonance reactor is provided by a sum of a leakage inductance of the transformer and a wiring inductance of the serial resonant circuit.

8. A DC power supply comprising:
a DC power source;
a power conversion circuit capable of generating an alternate current from a direct current;
a primary winding of a transformer, the primary winding being connected to an output of the power conversion circuit;
a secondary winding of the transformer;
a rectifier diode bridge circuit connected to the secondary winding;
and a filter circuit including a filter reactor and a filter capacitor, the filter circuit being connected to an output side of the rectifier diode bridge circuit,
wherein a resonance reactor is provided on an output side of the secondary winding, and
wherein a resonant switch circuit including a parallel circuit comprised of a diode and a semiconductor switch, configured for resonant circuit control, and a resonant capacitor is connected to the output side of the rectifier diode bridge circuit in parallel to the rectifier diode bridge circuit, whereby a serial resonant circuit comprised of the resonance reactor and the resonant capacitor in the resonant switch circuit is formed,
the DC power supply further comprising a snubber circuit that includes a snubber diode and a diode for discharging a snubber capacitor connected in series and is connected in parallel to the filter capacitor in the filter circuit, wherein the snubber capacitor is connected to an output point of the rectifier diode bridge circuit via a midpoint between the snubber diode and the diode for discharging the snubber capacitor connected in series,
whereby a function that suppresses a surge voltage generated in the rectifier diode bridge circuit is provided,
wherein in order to enhance performance of the snubber circuit, a resistor is connected in series to the snubber capacitor, and
wherein a resistance value of the resistor connected in series to the snubber capacitor is determined so as to satisfy $$R^2 - \frac{4L}{C} \geq 0,$$

where R is the resistance value, C is a capacitance value of the snubber capacitor, and L is an inductance of a current path for absorbing a surge voltage.

* * * * *